(No Model.)

T. G. BEAHAM.
CULINARY VESSEL.

No. 310,639. Patented Jan. 13, 1885.

WITNESSES:

INVENTOR:
T. G. Beaham
BY
ATTORNEYS.

UNITED STATES PATENT OFFICE.

THOMAS G. BEAHAM, OF ZANESVILLE, OHIO.

CULINARY VESSEL.

SPECIFICATION forming part of Letters Patent No. 310,639, dated January 13, 1885.

Application filed January 8, 1884. (No model.)

*To all whom it may concern:*

Be it known that I, THOMAS G. BEAHAM, of Zanesville, in the county of Muskingum and State of Ohio, have invented a new and Improved Culinary Vessel, of which the following is a full, clear, and exact description.

The object of my invention is to provide a new and improved earthenware vessel supported by a metal base in such a manner that both can contract and expand independently.

The invention consists in the construction and arrangement of parts, as will be hereinafter fully described, and specifically set forth in the claim.

Reference is to be had to the accompanying drawings, forming part of this specification, in which similar letters of reference indicate corresponding parts in both the figures.

Figure 1:
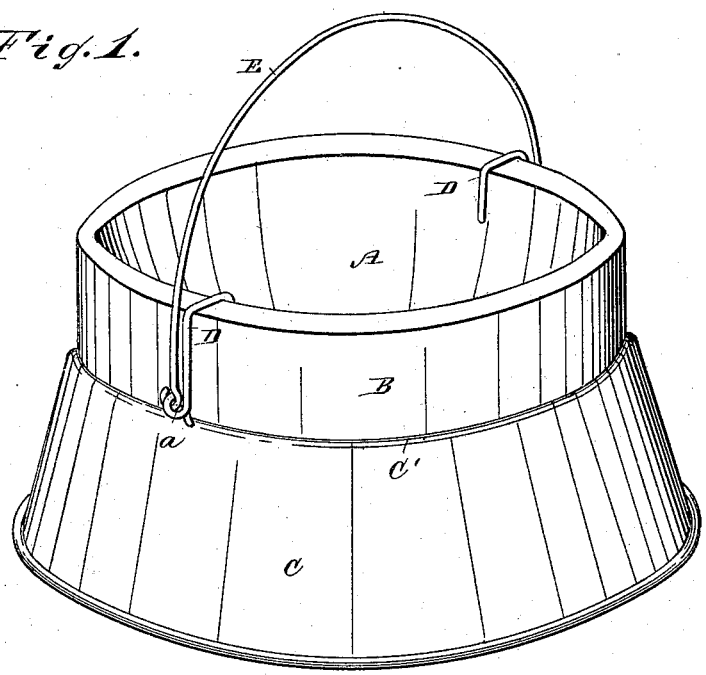
Figure 2:
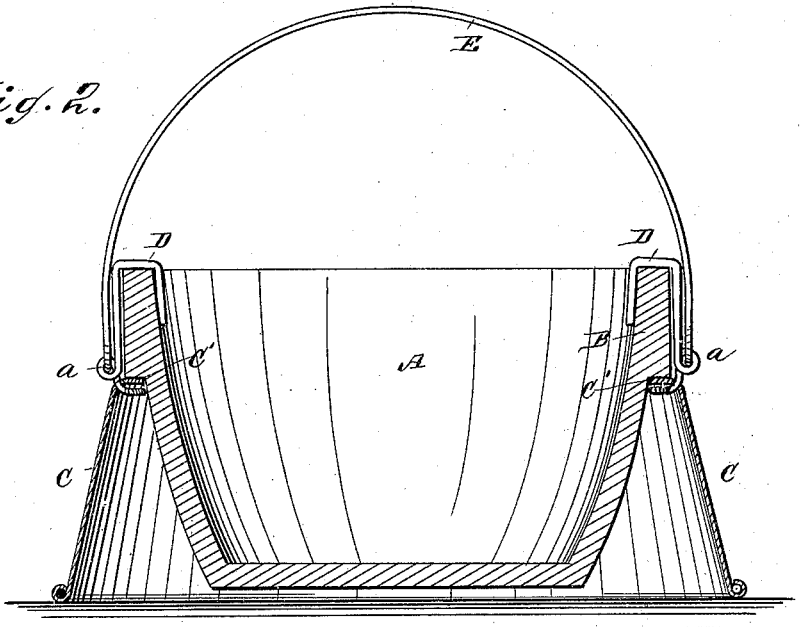

Figure 1 is a perspective view of my improved culinary vessel. Fig. 2 is a longitudinal sectional elevation of the same.

The earthenware crock or bowl A is provided with a rim, B, on its outer surface and at the upper edge, at the bottom of which rim an annular shoulder is formed. The said shoulder rests on the inwardly-projecting flange C', formed on the upper edge of an annular metal support, C, which is inclined outward from the bottom of the rim, and is of such height that when the crock rests upon the said support the bottom of the crock will be slightly above the bottom of the support. At diametrically-opposite points wire hooks D are held in the upper parts of the supports C, which hooks are shaped in such a manner as to fit over the rim and top edge of the crock or bowl. The hooks D are twisted in such a manner as to form eyes $a$, in which the ends of the bail E are held. The hooks D hold the crock on the support C, but do not bind them firmly together, thus allowing the crock and the support to expand and contract independently of each other, and thus preventing the cracking of the crock to a great extent. The inclined support deflects the heat and guides it toward and against the bottom and sides of the crock, which is thus heated very rapidly. The support also protects the crock from being broken or cracked in placing it down, &c. The shoulder formed by the rim B fits very closely on the flange C' of the support. The vessels can be packed very compactly for shipment, as the upper edge of one bowl can pass in between the outer side of the next bowl above it and the inner surface of the support of the said bowl.

Having thus described my invention, what I claim as new, and desire to secure by Letters Patent, is—

The combination, with the crock A, having a rim, B, and the metal support C, having an inwardly-projecting flange at its upper end, of the hooks D, secured at their lower ends within perforations in the flanged end of the support, bent at their upper ends to fit over the edge of the crock, and twisted between said ends to form eyes $a$ for the bail, substantially as set forth.

THOMAS G. BEAHAM.

Witnesses:
   H. C. VAN VOORHIS,
   A. A. FRAZIER.